INVENTOR
George E. King

Oct. 15, 1963 G. E. KING 3,107,322
ELECTRIC MOTOR CONTROL SYSTEM
Filed July 7, 1961 4 Sheets-Sheet 4

United States Patent Office 3,107,322
Patented Oct. 15, 1963

3,107,322
ELECTRIC MOTOR CONTROL SYSTEM
George E. King, Pittsburgh, Pa., assignor to Westinghouse Electric Corporation, East Pittsburgh, Pa., a corporation of Pennsylvania
Filed July 7, 1961, Ser. No. 122,429
7 Claims. (Cl. 318—443)

This invention relates to electrical control systems and more particularly to a system of control for an electric motor operating a large gate as a water discharge control gate at a dam.

The control system is used to control the operation of an electric motor coupled to raise and lower a large gate. The gate may have to be raised and lowered for a hundred feet or more.

Since the flow of large weights of liquid is involved, the requirement, at least over a considerable portion of the gate movement, is that the gate, on opening from a closed position, be raised in increments of a fixed distance, as a foot at a time, until the gate has traversed to some intermediate position which may be about half its total movement. Where the gate has a total movement of one hundred feet the intermediate position may be considered at approximately fifty feet. After the intermediate position is reached, the gate may without stopping, be moved to its final open position.

In lowering the gate from its uppermost position the gate may be moved in one continuous movement from its upper position to the intermediate position and thereafter in increments of a fixed distance, with a pause of any desired time period between each movement, to its closing position.

In apparatus heretofore used, a geared limit switch is used which is rather expensive, not very reliable, and difficult to manufacture and adjust.

One broad object of this invention is to accomplish the operating requirements heretofore mentioned more effectively and reliably and with apparatus that is simpler and less expensive.

Figure 1:
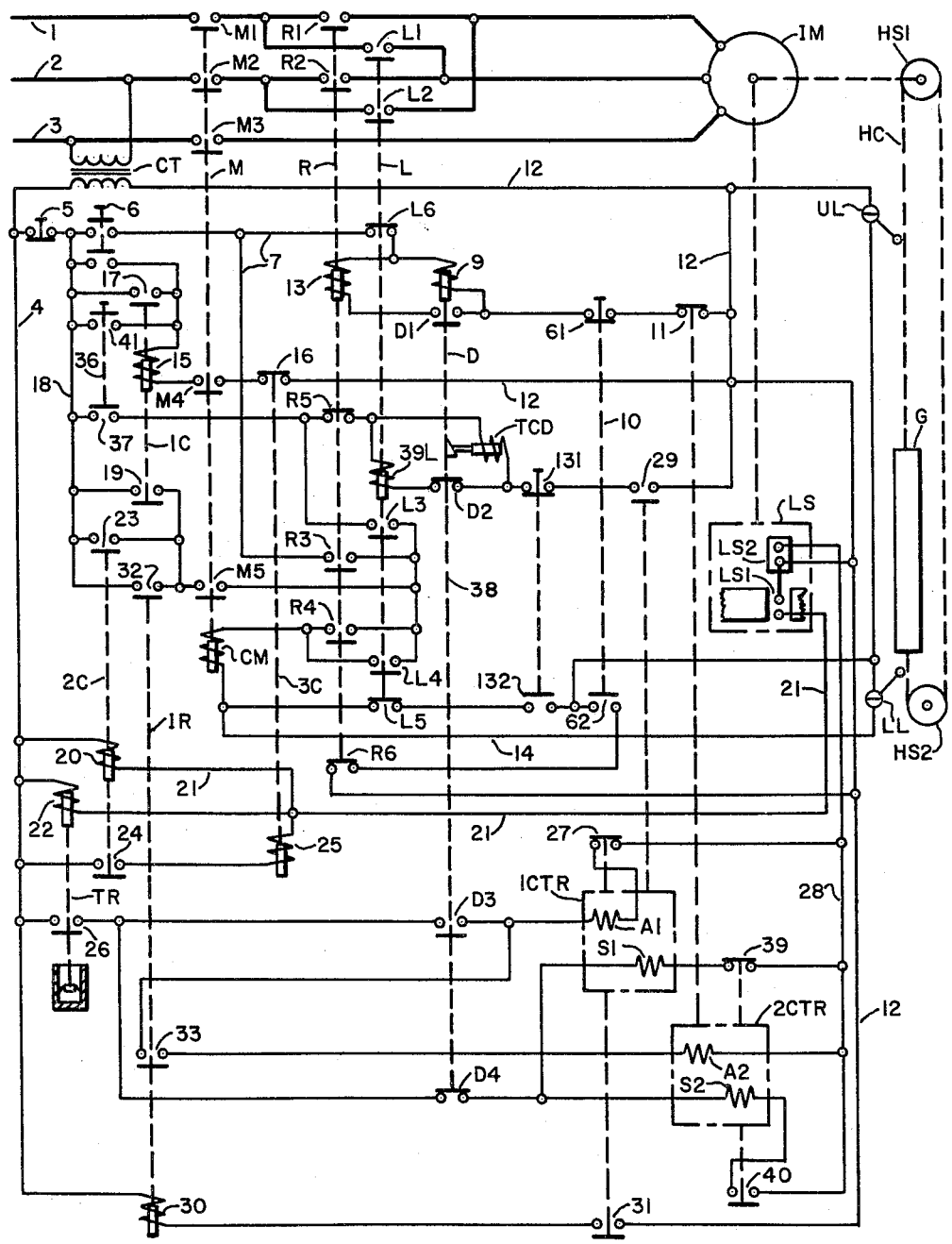
Figure 2A:
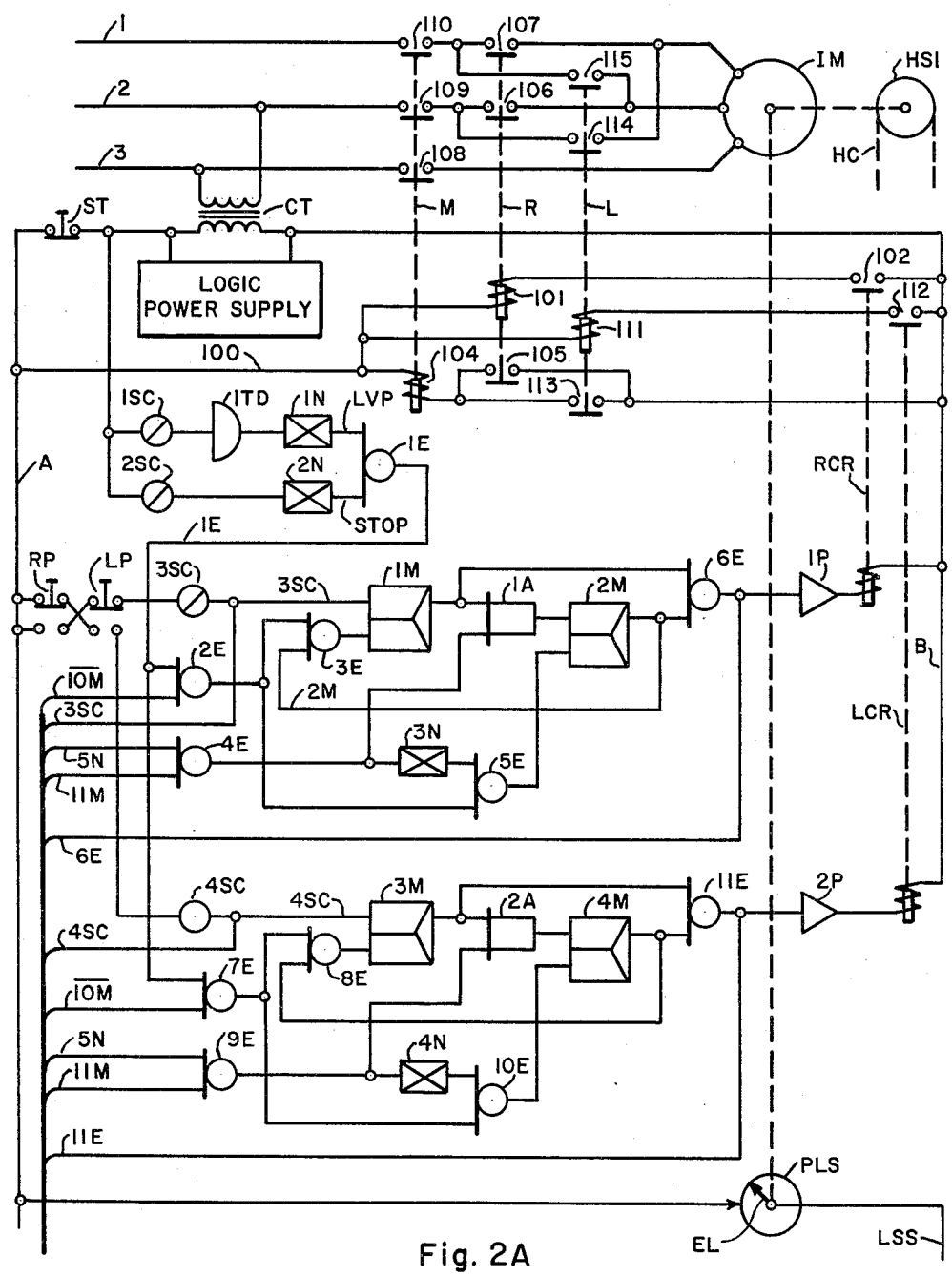
Figure 2B:
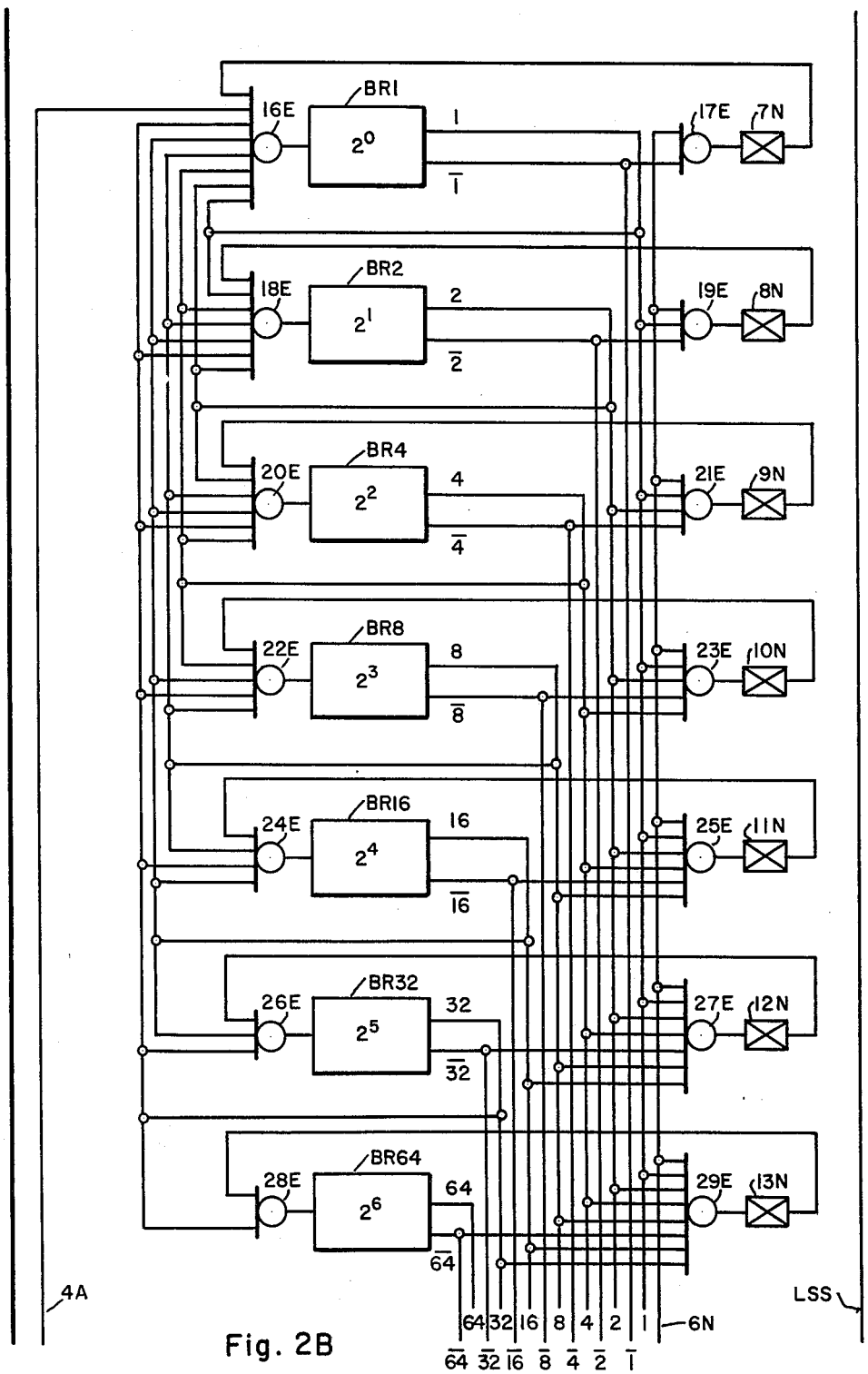
Figure 2C:
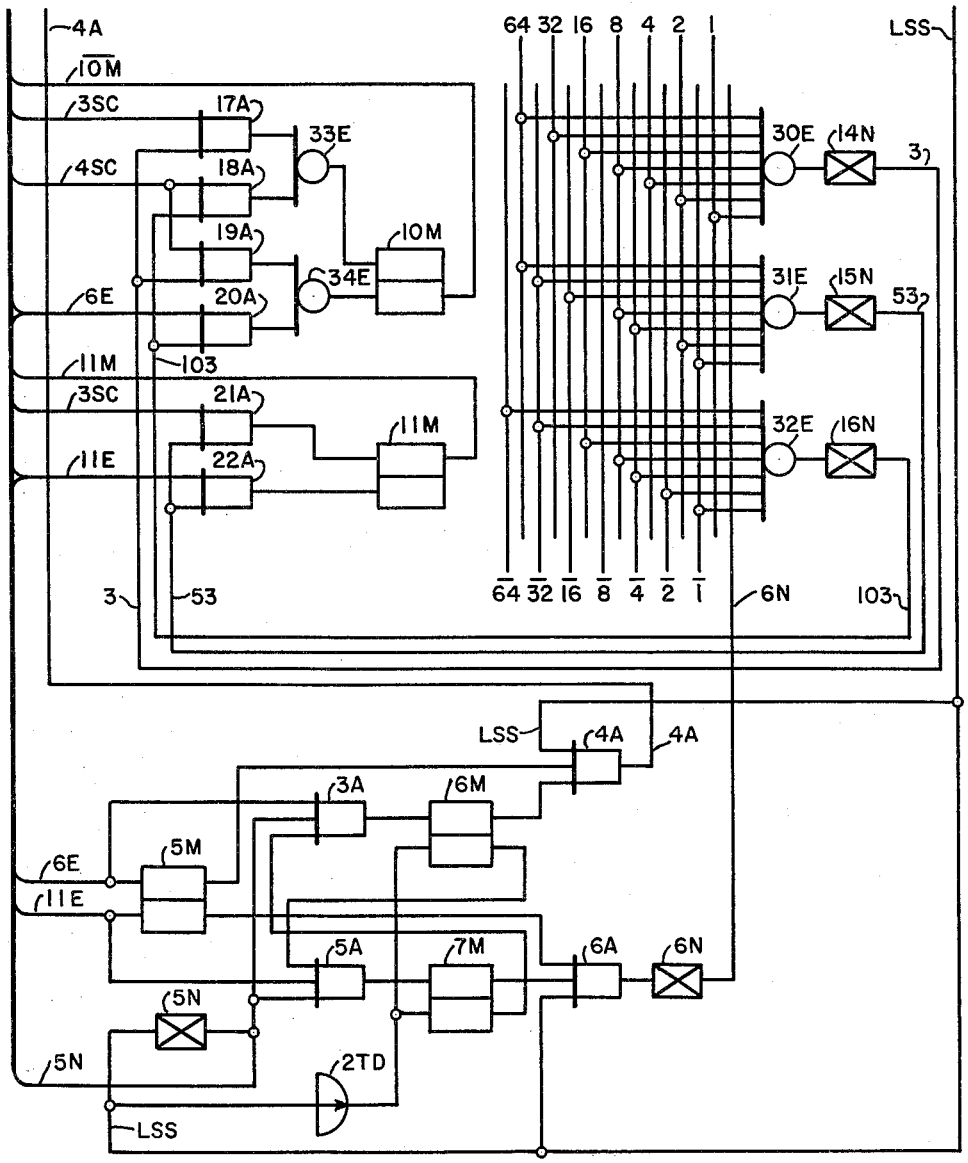

The object stated is merely representative. Other objects and advantages will become more apparent from a study of the specification and the drawings, in which:

FIGURE 1 is a diagrammatic showing of one embodiment of the invention;

FIGS. 2a, 2b, and 2c show a modification of this invention; and

Figure 3:
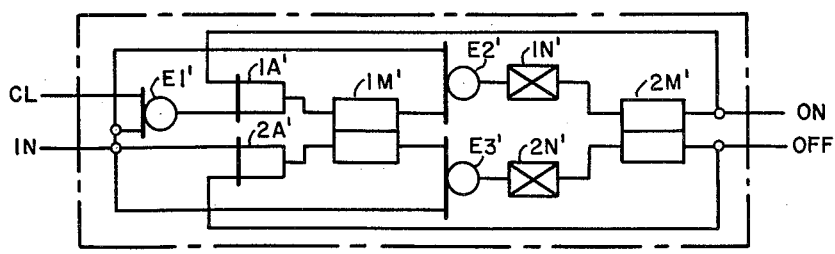

FIG. 3 is a diagrammatic showing of a binary register in the circuitry shown in FIGS. 2a, 2b and 2c.

In FIG. 1 and in part in FIG. 2a of the drawings the motor IM, which may be an induction motor or other alternating current motor, is shown coupled to the gate G through suitable means as sheaves and cables or sprocket wheels HS1 and HS2 and hoist chains HC.

A simple limit switch LS is coupled to the motor and has two switches that operate each time the motor makes a number of turns sufficient to move the gate a selected distance, as one foot. The limit switch is preferably a quick make and break type switch, operated by a cam which rotates one revolution for each one foot travel of the gate. The limit switch operates add-subtract counters which count the number of feet the gate moves.

Referring to FIG. 1, and assuming leads 1, 2, and 3 are energized, that the gate is at its bottom, or closed, position, and that the gate is to be opened, then the attendant depresses the raise button 6 just long enough until he notices the starting of the motor, or movement of the gate. The movement starts only a moment after the raise button is depressed.

Operation of the raise button 6 establishes a circuit which may be traced from terminal, or lead, 4 of the secondary of the control transformer CT, through the stop button 5, conductor 18, the raise button 6, conductor 7, the back contacts L6 of the lowering contactor L, the actuating coil 9 of the drive contactor D, contacts 61 of the raise over-travel-back-out push button 10, contacts 11 of the counting contactor, or relay, 2CTR to the other lead, or terminal, 12 of the secondary of control transformer CT. The instant the drive contactor D operates it closes its contacts D1 and D3 and opens its contacts D2 and D4. The drive contactor D is of the latch-in type and thus remains in its operated position. The closure of contacts D1 connects the actuating coil 13 of the raise contactor R in parallel with coil 9, and the raise contactor R operates to close its contacts R1, R2, R3, and R4, and open its contacts R5 and R6.

The closure of contacts R3 and R4 establishes a circuit from the energized conductor 7 through contacts R3 and R4, the coil CM of the main contactor M, conductor 14, the lower limit safety switch LL, upper limit safety switch UL to the energized lead 12.

The main contactor M thus operates to close its contacts M1, M2, M3, M4, and M5. The closure of contacts M4 establishes a circuit from energized lead 18, the lower contacts of raise button 6, the coil 15 of the control relay 1C, contacts M4, contacts 16 of control contactor, or relay, 3C, to the energized lead 12. Control relay 1C operates to close its contacts 17 and 19. Contactor 1C holds itself in through contacts 17 so that the raise button 6 may now be released, and the closure of contacts 19 establishes a circuit from conductor 18, contacts 19, M5, and R4 and coil CM to energized conductor 14. Since contacts R1 and R2 are closed, and contacts M1, M2, and M3 are closed by the operation of the main contactor M, it is apparent that a circuit is established from leads 1, 2, and 3 to the motor IM, and the motor starts. The motor through the hoist sprockets HS1 and HS2 and the hoist chain HC begins to move the gate upwardly in its guide-ways, not shown, to open the gate to the flow of water.

A snap acting drum type limit switch LS is coupled to the motor IM to be driven thereby. The switch LS2, for the invention herein disclosed, is always closed when the motor is stopped but immediately opens when the motor starts. Switch LS1 is immediately closed when the motor starts and remains closed until the drum of the limit switch again gets into position to close switch LS2.

The moment the switch LS1 closes certain circuits are established. One circuit may be traced from lead 4 through coil 20 of the control contactor 2C, conductor 21 through switch LS1 to lead 12. A second circuit is established from lead 4 through coil 22 of timing relay TR to energized lead 21. Contactor 2C closes its contacts 23 and 24, and time limit relay TR immediately closes its contacts 26.

The closure of contacts 23 provides a holding circuit for the main contactor M independent of contacts 19, and the closure of contacts 24 establishes a circuit from lead 4 through contacts 24 and coil 25 of control contactor 3C to lead 21. The contactor 3C opens its contacts 16 and control contactor 1C drops out opening contacts 17 and 19, neither of these operations effecting any other operation at the moment.

After the gate G has moved upwardly a selected distance, say twelve inches, the limit switch LS1 opens and limit switch LS2 closes. This operation effects dropout of both relays 2C and 3C, and, since the opening of the limit switch LS1 also opens the circuit for the time limit relay TR, time limit relay TR begins to time out. The dropout of the contactor 2C opens the circuit for coil CM and the main contactor drops out stopping the motor. The contacts M5 are, of course, also opened and the holding circuit, from lead 18 through contacts 19, M5 and R3 to lead 7, for coils 9 and 13, is opened.

The closure of limit switch LS2 establishes a circuit, before time relay TR times out, from lead 4 through the contacts 26 and D3, the "add" coil A1 of the counting relay 1CTR, maximum count contacts 27, conductor 28, through limit switch LS2 to conductor 12. A fraction of a second after this circuit has been established the time limit relay TR opens contacts 26 and the counting relay 1CTR counts one step. When it counts one step contacts 29 close.

All of the circuits, except for contacts D1, D2, D3 and D4, which are subject to the operation of the drive relay D which is latched into its operated position, are now in the same condition as when the gate was at its bottom position. To move the gate another step, say one foot, the raise push button 6 must again be depressed. The same cycle of operation is repeated, except that the counting relay now counts step two, and the gate will have moved up two feet.

The construction of the counting relay 1CTR is such that after one count contacts 29 close and thereafter remain closed until the gate again moves downwardly from the count 1 position to the count zero position.

In effect, contacts 29 serve as a limit switch to stop the gate in the bottom position and thus prevent any further downward operation of the gate. This will become more apparent hereinafter from a study of the lowering operation of the gate G.

Further the relay 1CTR provides that after a selected number of counts, say fifty, where the total gate movement is one hundred feet and the fifty foot position represents the hereinbefore mentioned intermediate position, the contacts 27 are opened and contacts 31 are closed. Since the add coil A1 is in the circuit of contacts 27, this coil can no longer be energized through contacts 26 and D3. Relay 1CTR is now inoperative in the "add" direction.

The closure of contacts 31 connects the coil 30 of the intermediate relay IR across leads 4 and 12, and this relay operates to close its contacts 32 and 33.

The next time the raise button 6 is closed to effect operation of the raise contactor R and the main contact M, to raise the gate G from the 50th position to the 51st position, the intermediate relay IR, through contacts 32, provides the holding circuit for the raise contactor R and the main contactor M. When contacts 26 close, a circuit is established from lead 4, through contacts 26, D3, and 33 add coil A2 of the counting relay 2CTR. This relay immediately opens contacts 39 and closes contacts 40 and without interruption counts fifty additional steps, or some other number of the total second half movement of the gate is other than fifty feet, and then operates to open the contacts 11, as the gate moves from the 99th step to the 100th step. Since these contacts 11 are in the circuit of coils 9 and 13, it is apparent that these relays, or contactors, R and D can no longer be energized to effect starting of the motor in the raise direction by the operation of the raise button 6. Since contactor R is dropped out, the main contactor M is deenergized and the motor stops the gate at the top.

When the lower button 36 is depressed a circuit is established through the lower contacts 37 of button 36 which may be traced from energized lead 18 through the lower contacts 37 of switch 36, contacts R5, the trip coil TCD, the contacts 131 of the lower over-travel-back-off switch 38, contacts 29, now closed, to lead 12. Contactor D drops out closing its contacts D2 and D4. The closure of contacts D2 establishes a circuit for coil 39L of the lowering contactor L. The operation of the lowering contactor L effects the closing of contacts L1, L2, L3 and L4 and the opening of contacts L5 and L6. The closure of contacts L3 and L4 establishes a circuit from lead 18 through the lower contacts 37 of switch 36, contacts L3 and L4, coil CM of the main contactor M to energized conductor 14. The main contactor operates and through contacts M4 and through the upper contacts 41 of push button 36 brings in 1C which through contacts 19, M5 and L4 holds contactor M in.

Relays 2C, 3C and TR are energized exactly as for raising, but since contacts D4 and the contacts 40 of counting relay 2CTR are now closed, subtract coil S2 of relay 2CTR is now energized. Relay 2CTR operates to close contacts 39 and to open contacts 40. The closure of contacts 39 energizes the subtract coil S1 of relay 1CTR which in turn closes contacts 31 to energize intermediate relay IR. Contacts 31 remain closed so that the motor operates to lower the gate, and as the gate moves from the 51st position to the 50th position contacts 31, through operation of 1CTR, are opened.

The opening of contacts 31 effects the deenergization of relay IR with the result that contacts 32 are opened to effect deenergization of the main contactor M to thus effect the stopping of the motor in such a position as to hold the gate at the 50th position.

When the lowering button 36 is now again depressed, the lowering operaiton of the motor is effected as before but contacts 32 no longer are closed. The continued operation of the motor now depends on the limit switches LS1 and LS2. When the gate has moved off the 50th position, limit switch LS2 opens and limit switch LS1 closes. The closing of limit switch LS1 effects the energization of control relays 2C and 3C and the energization of timing relay TR. The operation of relay 3C removes the holding circuit for control relay 1C and the operation of control relay 2C effects the closing of contacts 23 to provide a holding circuit for the main contactor M and the lowering contactor L.

As soon as the gate has moved down one step—one foot—the limit switch LS1 opens and limit switch LS2 closes. But during the interim while the gate makes this one foot downward movement, contacts 26 are closed and in consequence a circuit is established from lead 4 through contacts 26 and D4, through the subtract coil S1 of the counting relay 1CTR and contacts 39 to energized conductor 28. The counting relay 1CTR thus counts one step down, namely counts a movement from the 50th position to the 49th position.

At the 49th position, the limit switches LS1 and LS2 are open and closed, respectively. The main contactor is thus deenergized and the motor is stopped with the gate in the 49th position.

To cause another downward movement switch 36 has to be again depressed. The cycle thus repeats itself with the gate stopping in the 48th position. Each step requires an operation of the switch 36. When the gate is in the number one position, a depression of switch 36 causes the last count to be made.

After the last count is made, switch 29 opens. No further downward operations can be effected because contacts 29 are in the circuit of the coil 39L of the lowering contactor L.

If for any reason there should be a malfunctioning of control apparatus or the inertia of the moving gate is such that the gate overtravels in the lowering direction, then the lower limit switch LL will operate and open the circuit for the coil CM of the main contactor. If the error is in the upper position, then limit switch UL will effect opening of the circuit for coil CM of main contactor M.

To get the gate to the correct position if it has moved down too far the over-travel-back-off switch 38 is actuated. This switch opens its upper contacts 131 to prevent any operation of the lowering contactor L and closes its lower contacts 132. Contacts 132 shunt the contacts of the lower limit switch LL. This means that the raise contactor R and the main contactor M, through the sequence of operations initiated by also depressing switch 6, will operate to back off the gate from its over-travel lower position.

If there has been an over travel at the upper position then limit switch UL will operate to stop any further upward movement of the gate. To back the gate off its upper position, the over-travel-back-off switch 10 is actuated. This switch opens its upper contacts 61 and closes its lower contacts 62. The opening of contacts 61 prevents the possibility of any further upward operation. The closure of contacts 62 shunts UL and if now the switch 36 is also depressed the motor will operate in the lowering direction to back the gate off its wrong upper position.

In the modification shown in FIGS. 2a, 2b, 2c and 3, the motor 1M is controlled, except for some main switches, by static logic devices and static binary counters, instead of electro-magnetic mechanical devices and counters, to effect the control of the gate movement. The counter is operated by a signal pulse each time the gate moves a selected distance. A proximity type sensing element, or limit switch, PLS is operated by being geared, or otherwise coupled, as shown, to the gate drive so that the operating element EL makes one revolution for each one foot of gate movement.

Any fixed distance, other than one foot, may be selected by a suitable choice of gear transmission. The device symbols used for the circuitry herein disclosed in FIGS. 2a, 2b, 2c and 3 are those approved by NEMA and are shown in section II, Standards for Control Devices, Part 15, Static Switching Control Devices, June 1959.

The static logic devices used may take the form of transistor logic units, capacitor type logic units, or electromagnetic type logic units. In this showing the electromagnetic type logic units are used.

FIG. 3 shows a binary register. It is an alternator in the sense that the output turns ON, after the termination of an input pulse, and then OFF, after the termination of the next input pulse, and so on. With reference to FIG. 3 this means if the terminal C1, the "clear" terminal, had been so energized—placed in such an electrical condition—that the MEMORY device 2M' shows an output at its OFF, or lower, terminal then the application of an input pulse and the termination of it at the IN terminal so changes the electrical condition of the OR elements E1', E2', and E3', the NOT elements 1N' and 2N', the AND elements 1A' and 2A', and the MEMORY elements 1M' and 2M', that element 2M' has an output at its upper terminal and no output at its lower terminal. When a second input impulse is applied and removed the output of the MEMORY device 2M' now again appears at its lower terminal. This cycle is repeated for each two signals that are applied and removed to the input terminal IN.

The binary counter shown in FIGS. 2b and 3 is just one of several types that may be used. In a binary counter using transistors and capacitors for example, the circuitry might be simpler. However, the binary counter shown is of the reversible type, in that add and subtract pulses may be used. When the gate is raised it adds the input pulses, and when the gate is lowered it subtracts the input pulses.

For the purpose of explaining the operation of the logic units the assumption is that the normal total movement of the gate is one hundred feet. The gate moves one foot, each time the Raise push button RP is depressed, from the zero, or gate closed or down, position to the 50 foot position and from the 50 foot position to the 100 foot position by one additional depression of the Raise push button RP. On lowering the gate from the 100 foot position one depression of the lower push button LP will cause movement of the gate from the 100 foot position to the 50 foot position and thereafter one depression of the lower push button LP will effect only one foot of downward movement, and the lower push button LP has to be depressed successively to get the gate to the zero, or bottom, position.

To allow for overtravel, the binary counter at start will be in such electrical condition to register the code for the decimal number 3, or $\overline{64}, \overline{32}, \overline{16}, \overline{8}, \overline{4}, 2, 1$, or in binary notation 0000011. At the midpoint, or 50 foot position, the counter will have a code output for the decimal number 53, or $\overline{64}, 32, 16, \overline{8}, 4, \overline{2}, 1$ or in binary notation 0110101. At the top the counter will register the code for the decimal number 103, or $64, 32, \overline{16}, \overline{8}, 4, 2, 1$ or in binary notation 1100111. Using De Morgan's theorems for taking the negative, or complement of the functions, the decimal number may be read with a NOT by interchanging the AND conditions to OR conditions and with all signals inverted.

The reversible binary counter and pulse circuitry are shown in FIGS. 2b and 2c. This portion of the circuitry is designed to prevent a false count. The gate G may be started in the Raise direction and then stopped by the stop push button ST, or stopped by power failure, even though the operating element EL of the proximity type limit switch PLS is not opposite the magnetic sensing element.

Assume that the gate is at the bottom, or zero, position and the Raise push button RP is momentarily depressed, whereupon an input signal passes from conductor A through the lower contacts of the Raise push button RP, the upper contacts of the Lower push button LP, the signal converter 3SC, the conductor 3SC, MEMORY unit 1M, OR unit 6E, amplifier 1P, the actuating coil of the raise control relay RCR to conductor B. Operation of relay RCR causes the closing of contacts 102 to establish a circuit from conductor A through conductor 100, actuating coil 101 of the raise contactor R, contacts 102 to conductor B. Operation of the raise contactor R closes contacts 105, 106 and 107 whereupon a circuit is established from conductor 100 through the actuating coil 104 of the main contactor M through contacts 105 to conductor B. Operation of the main contactor closes the contacts 108, 109 and 110. The brake (not shown) is released and the motor is thus energized and begins to raise the gate. At the starting of the gate, since the operating element EL is coupled to the gate, the operating element moves out of registry with its sensing element. This removes the input signal through the limit switch signal connector LSS to the NOT unit 5N and this NOT unit 5N now has an output signal.

The OR unit 6E also, through the lead 6E, supplies an input to the AND unit 3A and also to the MEMORY unit 5M. The unit 5M thus provides an input to the AND unit 4A.

To greatly facilitate the tracing of the circuitry and the identification of an output in a lead with the logic unit from which it proceeds, the same reference characters are herein used to designate the logic unit and its output lead.

The output signal from 5N through OR unit 4E turns 3N off and the AND logic unit 1A now produces an output signal to turn MEMORY unit 2M on. The signal from 2M now supplies an input to 1P through 6E and the output signal from 2M through 3E, also turns the MEMORY unit 1M off.

At this stage input signals 6E, $\overline{7M}$, and 5N are present at the input of the AND unit 3A which thus has an output supplied to the MEMORY unit 6M turning this unit on.

Since the motor is at this stage operating, the gate continues to rise and after a travel of twelve inches the proximity limit switch PLS produces a signal which turns 5N off and thus through 4E removes the input signal from 3N and its output, through 5E turns 2M off. The input to 1P through 6E is then removed and in consequence the raise control relay RCR is deenergized and contactors R and M drop out. The brake (not shown) is thus set and the motor stops the gate in the number one position. The sensitive element EL being now in registry with its output producing region supplies a third signal to the AND unit 4A and, since the MEMORY units 5M and 6M are already furnishing the other two input signals to 4A, this unit 4A, through 16E, produces an input signal which is supplied to BR1, and through 18E to BR2, and through 20E to BR4. At this point it should be kept in mind, as hereinabove explained, that BR1 and BR2 are in the ON state, that is, an output is present at the upper terminals of BR1 and BR2.

The MEMORY units 1M' in each of the binary registers BR1, BR2, and BR4 will flip but no output will appear until the input is removed. The signal from PLS also excites the time limit device 2TD and after a very short interval of time it produces an output signal to turn MEMORY unit 6M off. One of the inputs to 4A is now missing and 4A no longer produces an output signal causing the binary registers BR1 and BR2 to turn off and BR4 to turn on and changing the code to indicate the decimal number 4, or binary 0000100. The total code will be $\overline{64}, \overline{32}, \overline{16}, \overline{8}, 4, \overline{2}$ and $\overline{1}$.

The circuit conditions are now, except for binary registers BR1 and BR2, which are off, and binary register BR4, which is on, the same as they were before the raise button was first depressed. The cycle can now be repeated again and again to move the gate successively from the one foot position it now holds, to the second foot position, the third and so on. For the following signal—the two foot position—the complete code will be $\overline{64}, \overline{32}, \overline{16}, \overline{8}, 4, \overline{2}$, and 1. The BR1 register will change to its original electrical condition after each second signal, the BR2 binary register will return to its original electrical condition after each fourth signal, the BR4 after each eighth signal, and so on.

This will keep on each time the Raise push button is depressed until the mid-position is reached. At this fifty foot position, since the start was made with the 3 decimal number on the binary registers BR1 and BR2, the NOT unit 15N, since it receives no signal through OR unit 31E, has an output designated 53 corresponding to the code for decimal 53, namely $\overline{64}, 32, 16, \overline{8}, 4, \overline{2}$, and 1.

Now if the Raise push button is momentarily depressed, the sequence of operation is the same as for previous operations except that the signals from 3SC and signal 53 cause 21A to turn 11M on. The output of 11M, through OR element 4E, holds 3N off preventing it from supplying a signal to 2M so that this MEMORY unit 2M now does not turn off when 5N turns off. The gate thus continues to rise and the binary registers BR1 to BR64 together register a count each time the gate moves an additional foot. When the binary registers make the 103d count, showing a code output of 64, 32, 16, 8, 4, 2 and 1, then the signal is removed from 32E and NOT unit 16N has an output signal designated 103. The signal 103 and the one from 6E cause AND unit 20A to produce an output signal to 34E to cause MEMORY unit 10M to flip to produce an output signal $\overline{10M}$. This signal $\overline{10M}$ through OR elements 2E and 5E turns off 2M which, through OR element 6E amplifier 1P and the now hereby deenergized raise control relay RCR causes the stopping of the motor with the gate at the top position.

If the "Lower" push button LP is now depressed a signal now flows from conductor A through the top contacts of the "Raise" push button RP the lower contacts of the "Lower" push button LP, the signal converter 4SC, the MEMORY unit 3M, OR unit 11E, amplifier 2P, the actuating coil of the lowering control relay LCR. The operation of this relay effects the closing of contacts 112 which in turn effects the energization of the actuating coil for the lowering contactor L. The operation of the lowering contactor effects the closing of contacts 113, 114 and 115. The main contactor M is energized through the closing of contacts 113. The main contactor M operates its contacts 108, 109 and 110 and through contacts 114 and 115 energizes the motor to lower the gate.

Since 4SC also provides a signal to the AND unit 18A and the signal 103 is also on this unit the MEMORY unit 10M, through OR unit 33E is turned ON, and thus removing the $\overline{10M}$ signal from 7E. Since 11M is still ON its signal being supplied to the OR unit 9E and thus to the NOT unit 4N prevents the NOT unit 4N from producing an output. The OR unit 10E is thus not energized to effect the operation of the MEMORY unit 4M in such a way as to effect stopping of the motor in the downward direction.

The gate thus continues in the downward direction with the binary register counting in the reverse direction until count 53 is made. At count 53 the NOT unit 15N produces an output signal also designated 53. Since both signals 11E and 53 are supplied to the AND unit 22A this unit 22A turns 11M off. The signal is thus, through 4E, removed from 4N and its output, through 5E turns 4M off and thus effect the deenergization of the lowering control relay LCR and the gate is thus stopped at its mid position.

With the gate at the mid point, assume the "Lower" push button LP is again momentarily depressed. The motor will start in the lowering direction as before. The code of the binary registers will be in a condition representing the number 53, or in the conditions $\overline{64}, 32, 16, \overline{8}, 4, \overline{2}$, and 1. This means the binary registers BR32, BR16, and BR1 are in the ON state. When the gate reaches the level represented by number 52 then the AND unit 6A will produce a signal to turn off the NOT unit 6N. This, through unit 17E, removes the input signal from 7N and this unit now has an output applied to binary counter BR1 to turn it off, and the code is thus changed to number 52.

The signal from LSS is not present during the movement of the gate from the fifty foot position (code for 53) to the forty nine foot position (code for 52) and in consequence 5N is on and its signal, through 9E, turns 4N off and the AND logic unit 2A produces an output signal to turn 4M on. 4M now supplies an input signal to 2P through 11E and the output signal from 4M through 8E turns the MEMORY unit 3M off.

The instant the limit switch PLS at the forty nine foot position moves in registry the 5N output is turned off. The NOT unit 4N now has an output and through 10E, 4M and 11E and 2P effects the stopping of the motor. The push button LP must be depressed each time a downward movement is to be effected. The sequence is the same for each cycle except that the binary counters count backwardly, or down. When the bottom is reached the signal is removed from 30E and 14N now has an output and effects stopping of the motor with the gate at the bottom. Further operations of LP will not produce any downward movement of the gate.

Assume the gate to be at the level represented by number 32, or the code $\overline{64}, 32, \overline{16}, \overline{8}, \overline{4}, \overline{2}$, and $\overline{1}$. Then when 6A turns NOT 6N off, NOT 12N will produce a signal to turn BR32 off and BR1, BR2, BR4, BR8, and BR16 on. This code represents the number 31.

If the power should fail the motor is quickly brought to rest by the brake (not shown). On the return of power NOT 1N will produce a signal to turn the MEMORY units 1M, 2M, 3M and 4M to the OFF state. After a short time interval determined by 1TD the not unit 1N will turn off. The motor will thus not automatically restart when the power comes on, but can only be started by operation of either of the push buttons RP or LP.

When the stop button ST is depressed the no-voltage signal gets to 1N and 2N through 1SC and 1TD, and through 2SC.

Assume that during the initial movement of the gate from the zero position to the number one, or twelve inch, position that the stop button is depressed before the twelve inch position is reached, say at the 6 inch level.

The NOT unit 2N now produces an output signal and through 1E and 2E turns off 2M and effects the stopping of the motor. Now if instead of again operating the "Raise" button RP the "Lower" button LP is depressed. MEMORY 3M turns on, and since 5N is producing a signal, 4N is in the off state. Both inputs to 2A are now present and the output of 2A turns 4M on and through 11E and 2P effects operation of the motor in the lowering direction.

The signal from 11E also turns off 5M removing a signal from 4A and adding one to 6A. MEMORY 6M remains on and since the OFF signal is missing at 5A, 7M does not turn on. The gate thus reaches the normal bottom position and PLS produces a signal turning 5N off and exciting 2TD. The NOT unit 4N produces a signal to turn 4M off to deenergize LCR, L, and M. Since signal 5M is missing at 4A and signal 7M is missing at 6A the binary counter is not operated. It is thus apparent that no count is made by the binary counter.

If while the gate is at the bottom the "Lower" push button is depressed it will be noted that 14N has no inputs and thus has an output signal, signal 3. The lower push button has caused 4SC to produce a signal on 19A and this unit, through 34E turns 10M off. The $\overline{10M}$ signal holds the two MEMORY units 3M and 4M in the off state so that amplifier 2P is not excited and LCR can not pick up. On the other hand, if the "Raise" push button is depressed the signal from 3SC and signal 3 on 17A will turn 10M on causing 1M and 2M to turn on. While the foregoing descriptive material leaves some of the reference characters shown in the drawings unmentioned such failure to mention results merely from the fact that each of the chains of signals for each of the one hundred distinct gate positions have not been discussed, nor traced. For the man skilled in the art the unmentioned reference characters are of aid if he wishes to establish the chain of signals for any or all of the counts of the binary registers.

Although this invention has been described with a certain degree of particularity, it should be remembered though that the disclosures made are merely representative and that modifications of both embodiments may be made falling within the scope and spirit of this invention.

I claim as my invention:

1. In a system of control for an electric motor, in combination, a motor, supply terminals for the motor energized at a suitable potential, contactor means for connecting the motor to said terminals, switching means coupled to the motor to move in proportion to the motor shaft rotation, said switching means having certain first elements that hold an operative position only each time the motor shaft is moved from an initial particular angular position with reference to the motor frame to the same angular position with reference to the motor frame after completion of a cycle of operation of the motor in which each cycle of operation requires a selected number of complete motor shaft rotations and said switching means having certain second elements that hold an operative position only when the motor shaft is not in any of its particular angular positions, control circuitry including control switches and static logic elements to control said control switches for effecting the operation of said contactor means to connect the motor to said terminals to effect a cycle of operation of the motor, means comprising static logic elements responsive to said second elements of said switching means to effect the operation of said contactor means to disconnect the motor from said terminals and counter means comprising static logic control elements and a binary static counter responsive to said first elements of said switching means to make a count of each cycle of operation of said motor.

2. In a system of control for an electric motor, in combination, a motor, supply terminals for the motor energized at a suitable potential, contactor means for connecting the motor to said terminals, switching means coupled to the motor to move in proportion to the motor shaft rotation, said switching means having certain first elements that hold an operative position only each time the motor shaft is moved from an initial particular angular position with reference to the motor frame to the same angular position with reference to the motor frame after completion of a cycle of operation of the motor in which each cycle of operation requires a selected number of complete motor shaft rotations and said switching means having certain second elements that hold an operative position only when the motor shaft is not in any of its particular angular positions, control circuitry including control switches for effecting the operation of said contactor means to connect the motor to said terminals to effect a cycle of operation of the motor, means responsive to said second elements of said switching means to effect the operation of said contactor means to disconnect the motor from said terminals and counter means responsive to said first elements of said switching means to make a count of each cycle of operation of said motor means responsive to a particular count of said counting means to shunt certain said control circuitry for a selected number of counts to effect uninterrupted operation of the motor for a selected number of cycles of operation to a last count.

3. In a system of control for an electric motor, in combination, a motor, supply terminals for the motor energized at a suitable potential, contactor means for connecting the motor to said terminals, switching means coupled to the motor to move in proportion to the motor shaft rotation, said switching means having certain first elements that hold an operative position only each time the motor shaft is moved from an initial particular angular position with reference to the motor frame to the same angular position with reference to the motor frame after completion of a cycle of operation of the motor in which each cycle of operation requires a selected number of complete motor shaft rotations and said switching means having certain second elements that hold an operative position only when the motor shaft is not in any of its particular angular positions, control circuitry including control switches and static logic elements to control said control switches for effecting the operation of said contactor means to connect the motor to said terminals to effect a cycle of operation of the motor, means comprising static logic elements responsive to said second elements of said switching means to effect the operation of said contactor means to disconnect the motor from said terminals and counter means comprising static logic control elements and a binary static counter responsive to said first elements of said switching means to make a count of each cycle of operation of said motor means responsive to a particular count of said counting means to shunt certain of said control circuitry for a selected number of counts to effect uninterrupted operation of the motor for a selected number of cycles of operation to a last count.

4. In a system of control for an electric motor, in combination, a motor, supply terminals for the motor energized at a suitable potential, contactor means for connecting the motor to said terminals, switching means coupled to the motor to move in proportion to the motor shaft rotation, said switching means having certain first elements that hold an operative position only each time the motor shaft is moved from an initial particular angular position with reference to the motor frame to the same angular position with reference to the motor frame after completion of a cycle of operation of the motor in which each cycle of operation requires a selected number of complete motor shaft rotations and said switching means having certain second elements that hold an operative position only when the motor shaft is not in any of its particular angular positions, control circuitry including control switches for effecting the operation of said contactor means to connect the motor to said terminals to effect a cycle of operation of the motor, means responsive to said second elements of said switching means to effect the operation of said contactor means to disconnect the motor from said terminals and counter means responsive to said first elements of said switching means to make a count of each cycle of operation of said motor and means responsive to the last count of said counting means to open certain switches of the control circuitry to prevent any further operation of the motor in the particular direction of operation set up by the initial starting of the motor.

5. In a system of control for an electric motor, in combination, a motor, supply terminals for the motor energized at a suitable potential, contactor means for connecting the motor to said terminals, switching means coupled to the motor to move in proportion to the motor shaft rotation, said switching means having certain first elements that hold an operative position only each time the motor shaft is moved from an initial particular angular position with reference to the motor frame to the same angular position with reference to the motor frame after completion of a cycle of operation of the motor in which each cycle of operation requires a selected number of complete motor shaft rotations and said switching means having certain second elements that hold an operative position only when the motor shaft is not in any of its particular angular positions, control circuitry including control switches and static logic elements to control said control switches for effecting the operation of said contactor means to connect the motor to said terminals to effect a cycle of operation of the motor, means comprising static logic elements responsive to said second elements of said switching means to effect the operation of said contactor means to disconnect the motor from said terminals and counter means comprising static logic control elements and a binary static counter responsive to said first elements of said switching means to make a count of each cycle of operation of said motor and means responsive to the last count of said counting means to open certain switches of the control circuitry to prevent any further operation of the motor in the particular direction of operation set up by the initial starting of the motor.

6. In a system of control for an electric motor, in combination, a motor, supply terminals for the motor energized at a suitable potential, contactor means for connecting the motor to said terminals, switching means coupled to the motor to move in proportion to the motor shaft rotation, said switching means having certain first elements that hold an operative position only each time the motor shaft is moved from an initial particular angular position with reference to the motor frame to the same angular position with reference to the motor frame after completion of a cycle of operation of the motor in which each cycle of operation requires a selected number of complete motor shaft rotations and said switching means having certain second elements that hold an operative position only when the motor shaft is not in any of its particular angular positions, control circuitry including control switches and static logic elements to control said control switches for effecting the operation of said contactor means to connect the motor to said terminals to effect a cycle of operation of the motor, means comprising static logic elements responsive to said second elements of said switching means to effect the operation of said contactor means to disconnect the motor from said terminals and counter means comprising static logic control elements and a binary static counter responsive to said first elements of said switching means to make a count of each cycle of operation of said motor means responsive to a particular count of said counting means to shunt certain of said control circuitry for a selected number of counts to effect uninterrupted operation of the motor for a selected number of cycles of operation to a last count, and means responsive to the last count of said counting means to open certain switches of the control circuitry to prevent any further operation of the motor in the particular direction of operation set up by the initial starting of the motor.

7. In a system of control for an electric motor, in combination, a motor, supply terminals for the motor energized at a suitable potential, contactor means for connecting the motor to said terminals, switching means coupled to the motor to move in proportion to the motor shaft rotation, said switching means having certain first elements that hold an operative position only each time the motor shaft is moved from an initial particular angular position with reference to the motor frame to the same angular position with reference to the motor frame after completion of a cycle of operation of the motor in which each cycle of operation requires a selected number of complete motor shaft rotations and said switching means having certain second elements that hold an operative position only when the motor shaft is not in any of its particular angular positions, control circuitry including control switches for effecting the operation of said contactor means to connect the motor to said terminals to effect a cycle of operation of the motor, means responsive to said second elements of said switching means to effect the operation of said contactor means to disconnect the motor from said terminals and counter means responsive to said first elements of said switching means to make a count of each cycle of operation of said motor, means responsive to a particular count of said counting means to shunt certain of said control circuitry for a selected number of counts to effect uninterrupted operation of the motor for a selected number of cycles of operation to a last count, and means responsive to the last count of said counting means to open certain switches of the control circuitry to prevent any further operation of the motor in the particular direction of operation set up by the initial starting of the motor.

References Cited in the file of this patent

UNITED STATES PATENTS

| | | |
|---|---|---|
| 2,814,013 | Schweighofer | Nov. 19, 1957 |
| 2,989,680 | Weiser et al. | June 20, 1961 |
| 3,017,557 | Amato | Jan. 16, 1962 |